US009124783B2

(12) United States Patent
Maslan

(10) Patent No.: US 9,124,783 B2
(45) Date of Patent: Sep. 1, 2015

(54) METHOD AND SYSTEM FOR AUTOMATED LABELING AT SCALE OF MOTION-DETECTED EVENTS IN VIDEO SURVEILLANCE

(71) Applicant: CAMIOLOG, INC., Burlingame, CA (US)

(72) Inventor: Jonathan Carter Maslan, Burlingame, CA (US)

(73) Assignee: CAMIOLOG, INC., Burlingame, CA (US)

(*) Notice: Subject to any disclaimer, the term of this patent is extended or adjusted under 35 U.S.C. 154(b) by 330 days.

(21) Appl. No.: 13/629,048

(22) Filed: Sep. 27, 2012

(65) Prior Publication Data

US 2013/0083198 A1    Apr. 4, 2013

Related U.S. Application Data

(60) Provisional application No. 61/542,062, filed on Sep. 30, 2011.

(51) Int. Cl.
*H04N 7/18* (2006.01)
(52) U.S. Cl.
CPC ....................... *H04N 7/188* (2013.01)
(58) Field of Classification Search
CPC ....................................................... H04N 7/188
USPC .......................................................... 348/155
See application file for complete search history.

(56) References Cited

U.S. PATENT DOCUMENTS

| | | |
|---|---|---|
| 6,628,835 B1 | 9/2003 | Brill et al. |
| 6,940,998 B2 | 9/2005 | Garoutte |
| 6,999,620 B1 | 2/2006 | Harville |
| 7,068,842 B2 | 6/2006 | Liang et al. |
| 7,143,434 B1 | 11/2006 | Paek et al. |
| 7,280,673 B2 | 10/2007 | Buehler et al. |
| 7,302,451 B2 | 11/2007 | Radhakrishnan et al. |
| 7,327,885 B2 | 2/2008 | Divakaran et al. |
| 7,418,134 B2 | 8/2008 | Schwartz et al. |
| 7,447,337 B2 | 11/2008 | Zhang et al. |
| 7,457,436 B2 | 11/2008 | Paragios et al. |
| 2005/0074140 A1* | 4/2005 | Grasso et al. ................. 382/103 |
| 2006/0171453 A1* | 8/2006 | Rohlfing et al. ......... 375/240.01 |
| 2006/0255931 A1 | 11/2006 | Hartsfield et al. |
| 2011/0172822 A1* | 7/2011 | Ziegler et al. ................. 700/259 |
| 2011/0221895 A1 | 9/2011 | Sharma |

OTHER PUBLICATIONS

Hou, et al., "Real-Time Multimedia Applications in a Web-Based Robotic Telecare System", Journal of Intelligent and Robotic Systems, vol. 38; retrieved online on Nov. 14, 2012 from url: http://www.icmcc.org/pdf/2003HouJIRS.pdf, Sep. 2003, pp. 135-153.

* cited by examiner

*Primary Examiner* — Christopher S Kelley
*Assistant Examiner* — Asmamaw G Tarko
(74) *Attorney, Agent, or Firm* — Michael A. Glenn; Perkins Coie LLP

(57) ABSTRACT

A method and system are provided for automated labeling at scale of motion-detected events in video surveillance imagery that may be private to and viewable only by the owner of that imagery. Further provided are processing, organization, and archival aspects related to such automated labeling at scale.

15 Claims, 15 Drawing Sheets

| Entity and Indexes | Status | Index Entry Count | Index Storage |
|---|---|---|---|
| QueryView | | | |
| userId ↑ , dateCreated ↓ | Serving | 189 | 17 KBytes |
| UploadedContent | | | |
| appUserKey ↑ , dateCreated ↓ | Serving | 14622801 | 3 GBytes |
| appUserKey ↑ , dateCreated ↑ | Serving | 14522801 | 3 GBytes |
| appUserKey ↑ , labels ↑ , dateCreated ↓ | Serving | 14750939 | 3 GBytes |
| appUserKey ↑ , labels ↓ , dateCreated ↑ | Serving | 14760939 | 3 GBytes |
| appUserKey ↑ , subject ↑ , dateCreated ↓ | Serving | 14532801 | 4 GBytes |
| appUserKey ↑ , subject ↓ , dateCreated ↑ | Serving | 14522801 | 4 GBytes |

METHOD AND SYSTEM FOR AUTOMATED LABELING AT SCALE OF MOTION-DETECTED EVENTS IN VIDEO SURVEILLANCE

CROSS REFERENCE TO RELATED APPLICATIONS

This patent application claims priority from U.S. Provisional Patent Application Ser. No. 61/542,062, METHOD AND SYSTEM FOR AUTOMATED LABELING AT SCALE OF MOTION-DETECTED EVENTS IN VIDEO SURVEILLANCE, filed Sep. 30, 2011, the entirety of which is incorporated herein by this reference thereto.

BACKGROUND OF THE INVENTION

1. Technical Field

This invention relates generally to the field of video surveillance services. More specifically, this invention relates to video surveillance services for video image processing, organization, and archival.

2. Description of the Related Art

Video surveillance technology is an industry that has become available to everyday end users. The wide variety of video surveillance tools may span from webcams for home surveillance to full service business video surveillance and security systems with video security cameras. As well, the video surveillance industry includes algorithms for feature detection on images and storage of video, such as on YouTube by YouTube, LLC in San Bruno, Calif. The industry includes Wi-Fi video cameras for deployment in the home, such as for example, by Dropcam, Inc. in San Francisco, Calif. By such camera, an end user may monitor a particular scene, such as a room in a house, from a handheld device or a computer. Another current product offered in the industry is a competing video surveillance archiving service by sensr.net, Inc. in Incline Village, Nev. By such service, an end user may monitor a scene from an online account and receive alerts activated by detected motion. Further, images from such camera may be stored in the cloud.

SUMMARY OF THE INVENTION

A method and system are provided for automated labeling at scale of motion-detected events in video surveillance imagery that may be private to and viewable only by the owner of that imagery. Further provided are processing, organization, and archival aspects related to such automated labeling at scale.

BRIEF DESCRIPTION OF THE DRAWINGS

FIG. 14 is an example of an application window of datastore labels and indexes, according to an embodiment.

DETAILED DESCRIPTION OF THE INVENTION

Embodiments herein enable automated labeling at scale of motion in video surveillance images. For purposes of discussion herein, at scale may mean in near real time, e.g. within seconds, across a large plurality of cameras, across a large numbers of images, and across large numbers of camera scenes. Such images may be private to the user. As well, such images may be sourced from cameras without the intelligence or context required for precise labeling and organization of events in the monitored area. Further, in an embodiment, learning is automated to improve accuracy of judging significant motion without necessarily requiring manual adjustments or camera updates to correct for rain, spider webs, shadows, etc.

In an embodiment, to scale computationally-intensive image analysis to serve millions of cameras, the processing is partitioned into smaller tasks each of which may be distributed and scheduled dynamically across many server instances.

Figure 1:
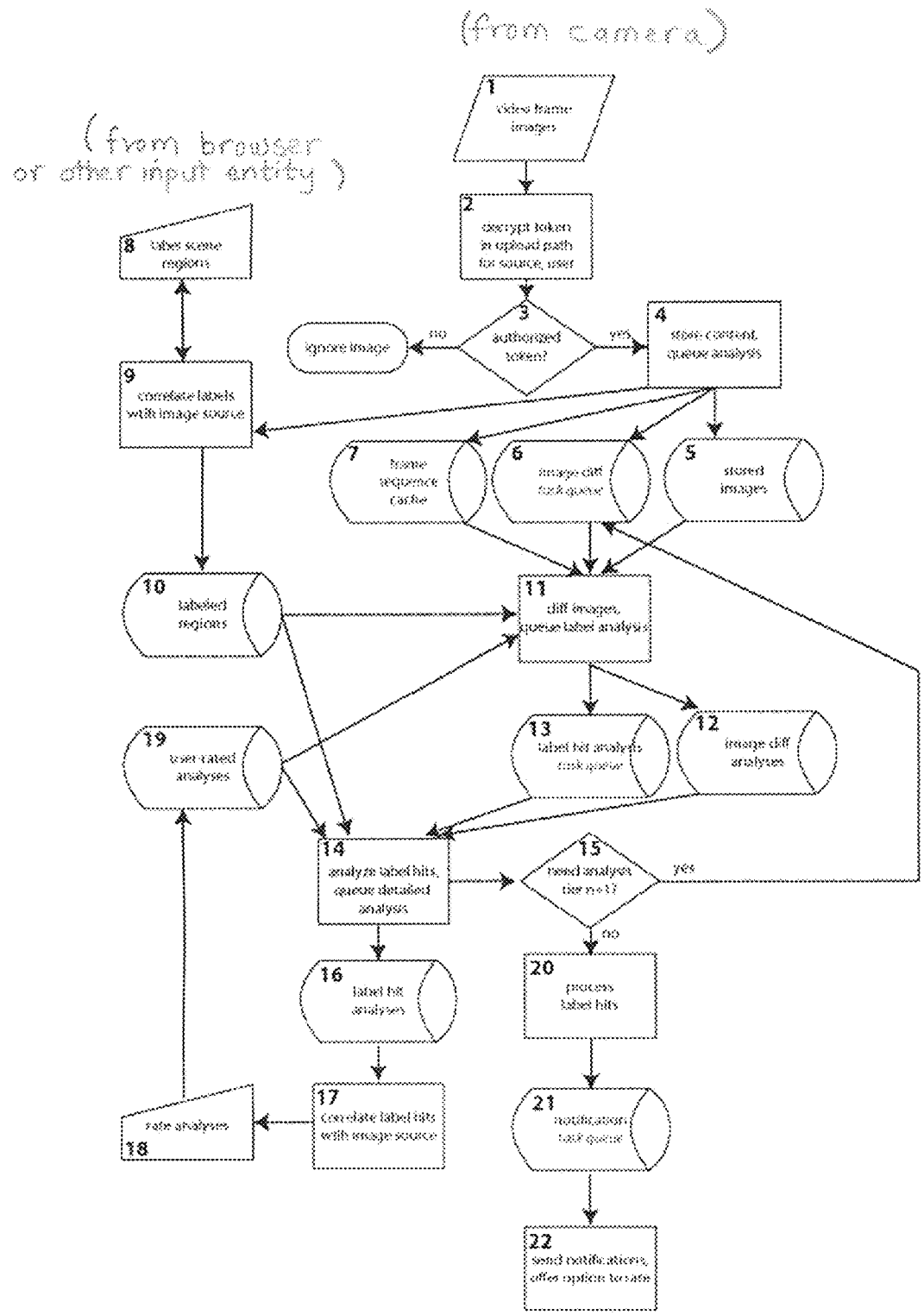
FIG. 1 is a flow diagram of the processing pipeline and user interactions that enable large scale labeling and indexing of video surveillance imagery, according to an embodiment.

An embodiment may be understood with reference to FIG. 1, a flow diagram of the processing pipeline and user interactions that enable large scale labeling and indexing of video surveillance imagery (100). It should be appreciated that such flow diagram is a particular instantiation of the concepts described herein and is not meant to be limiting. But what we really are trying to patent is how you do this in near real time at scale across any set of cameras. So that would be the idea.

Step 1. Receive Video Frame Images

In an embodiment, cameras may send video frame samples triggered by events which may include but are not limited to motion, heat, sound, time, or sampling rate. Such cameras may be configured to send samples via protocols supported by the camera. Such protocols may include but not limited to HTTP, FTP, and email attachment. As well, an embodiment may use an encrypted token passed as part of the image transfer that authorizes the upload of the content and contain identification information, such as but not limited to the identification of the user and camera represented by the upload. In an embodiment, the passing of the token depends on the protocol. For example, for FTP the token is supplied in the username, for HTTP the token is supplied in the upload URL path, and for Email the upload token is supplied in the email address itself.

Step 2. Receive and Decrypt Token in Upload Path for Source and/or User

In an embodiment, because network cameras may be limited and thus may not be sufficiently secure to store sensitive username and password information, such cameras may instead use and send an encrypted token that uniquely identifies a user and camera.

Step 3. Determine Whether Token is Authorized

In an embodiment, when a user and/or camera are not authorized to upload content then the uploaded content is ignored. Examples of reasons why such user or camera are not authorized may be due to but are not limited to being due to invalid authentication credentials or unauthorized state of the account, e.g. of the user.

Step 4. Store Content, Populate Cache, Queue Analysis as New Task

In an embodiment, uploaded content may be stored and indexed as exemplified in steps 5, 6 and 7 hereinbelow which use storage mechanisms for the image, difference task queue, and memcache image sequence, respectively. A cache of the most recent incoming frame sequences for each camera may be provided and may be populated in sequential order such that subsequent analyses have fast, efficient access to such content. In an embodiment, analysis of new content may be queued as a new task. In an embodiment, when content first comes arrives, the system stores such content and subsequently schedules a new task, which is to analyze what was just stored.

Step 5. Store Raw Content

In an embodiment, raw content including but not limited to video, audio, images, and meta-data like timestamps may be stored in a particular storage, e.g. high replication storage, accessible to many server instances. For example, images and video may be stored with Google's High Replication Datastore to ensure that content is accessible for analysis among tasks running in parallel across one or more datacenters.

Step 6. Generate and Populate the Image Difference Task Queue

In an embodiment, an image difference task is queued for execution and populated with a definition of the task that can be executed with idempotence in order to tolerate failures and re-tries across distributed computers. Such image difference task queue may be defined as an analysis work unit to be completed when incoming frames are compared to previous frames. The analysis work unit can include pair-wise image differences, statistical patterns across multiple images, and recursive analysis of particular regions of the scene over time. The number of frames under consideration may vary, and the analysis work unit is complete after having received and considered the input images required to judge the changes in the particular frame. Once that frame's motion has been analyzed, the results of that analysis are stored in the HRD datastore to be used as input for subsequent analyses of motion, matching of labels, and triggering of user notifications. The task queue itself is a Google App Engine data structure backed by both cached memory and High Replication Datastore with task scheduling and re-try-upon-failure rules that ensure each analysis work unit is completed while executing the tasks across multiple dynamically provisioned servers.

In an embodiment, such task includes comparing at least two frames, could be more than two frames, to determine what has changed in the scene. For example, according to an embodiment, a sequence of comparisons of images is processed. It should be appreciated that such sequence of comparisons may include a comparison of one frame and the one immediately prior or may be a sensitive analysis to a sequence in the last few minutes. Regardless of the characterization of the type of comparisons, embodiments herein determine what has changed over the last few frames of motion.

Figure 7:
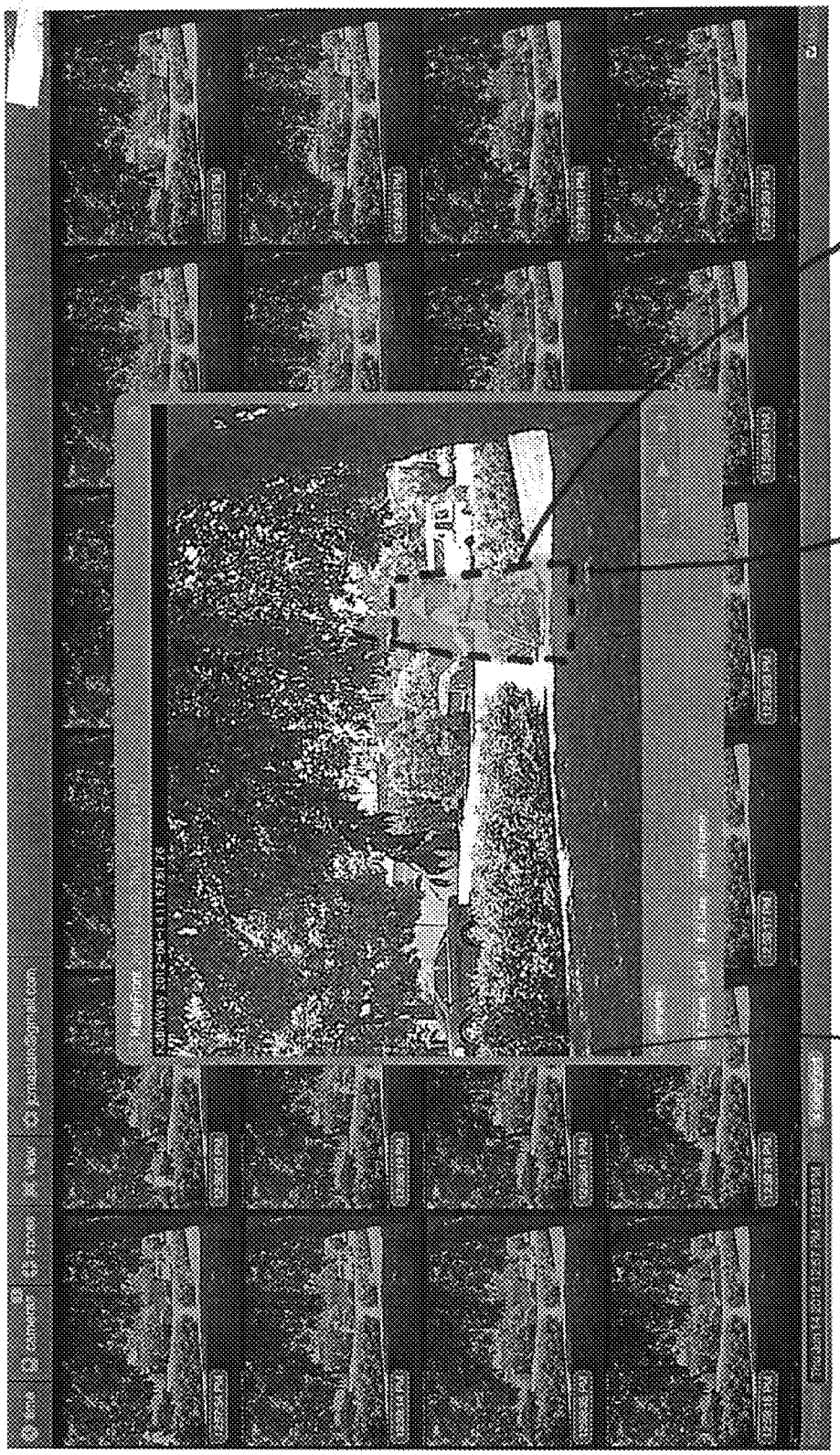
FIG. 7 is a sample screen print of a postal delivery in which the postman is overlaid with an orange vapor cloud indicating significant motion, according to an embodiment.

An embodiment can be understood with reference to FIG. 7. For example, in a sequence in which frequent motion from blowing trees 701 is mixed with the motion of a postman delivering mail 702, the analysis of motion differences looks across the prior 10 minutes of motion patterns to isolate the postman as the new motion of interest instead of including the motion of the recurring moving branches and shadows. By comparing the motion difference identified in the postman frame with the pattern of motion differences in the prior frames, the postman frame is more accurately labeled as motion warranting the user's interest and worthy of being labeled as interesting motion.

Step 7. Populate Frame Sequence Cache

In an embodiment, a frame sequence cache may be provided and populated where such cache maintains for each camera source the most recently received image frames in sequential order. For example, a user's cameras named "front" and "back" might each maintain a cache of the last 30 motion images received from the camera in time-sequential order. The rate at which motion images are cached varies by camera, because the scene observed by each camera varies in the amount of motion occurring in that scene. Though stored permanently in Google App Engine (GAE) High Replication Datastore, each camera's motion sequence is also cached in memory using Google Memcache that is accessible to multiple servers such that motion analyses have fast in-memory access to the entire frame sequence under consideration.

Step 8. Label Scene Regions

In an embodiment, this step begins a process from an end user set-up viewpoint. The end user may define label names s/he wants associated with particular regions of an observed scene. In an embodiment, from a browser, the user may define one or more contiguous or non-contiguous regions by labeling such regions. For example, in an implementation, such regions may be labeled by any of click, drag, and extended-select of html/css overlays on the scene. Examples of such labels may include but are not limited to "mailbox", "entrance", "expensive supplies." It should be appreciated that examples herein currently allow labeling in any browser as an innovative way to enable users to designate zones of interest without having to learn camera-specific tools or use camera-specific installed software. However, embodiments herein allow labeling in smartphone applications or in automated suggestions and so forth.

Step 9. Correlate Labels with Image Source and Translate into Percentage Offsets In an embodiment, the system uses the decoded upload token to identify the user and camera image to present to the user for labeling. It should be appreciated that Step 9 reflects that the user may need to see a sample image on which to draw those labeled zones. Thus, this step may be the step that identifies a recently uploaded image to present to the user in performing step 8. The upload token used to store a recent image is used to identify the image as belonging to a particular user's camera in order to present a sample image corresponding to the stored recent image for the user's labeling of regions of the scene on the image. In an embodiment, the labeled regions are translated into percentage offsets from the edges of the image such that such labeled regions may be processed at any image resolution.

For example, when a user draws a 40×20 (width×height) pixel rectangular region in the center of a sample image with pixel dimensions 640×480, that region is translated into a percentage offset calculated as:

top=230/480=47.92% left=300/640=46.88% width=40/640=6.25% height=20/480=4.17%

By recording the user's labeled regions as percentage offsets, the motion analysis work unit is free to choose variably sized input images to optimize cost and performance.

It should be appreciated that line from Step 4 to Step 9 in FIG. 1 may represent when one of the recently stored images is used as the canvas for which the regions of the scene may be labeled. In an embodiment, the system stores the labeled regions as meta-data about the content source. Thus, those labeled regions may be part of the logical definition of the camera, however actually may be stored independent of the camera such that they may vary over time, e.g. the same camera may have labeled "tent" in the summer but removed that label once the tent was removed.

Step 10. Store Labeled Regions

In an embodiment, labeled regions may be stored as associated with a particular camera source and user. That is, the camera source is identified uniquely by the combination of its owning user account and its name. For example, the camera source named "front yard" that is owned by user id "1180036789" uniquely identifies that camera source.

Thus, in an embodiment, regions that apply for a particular camera source are stored. For example, in an embodiment, an end user has defined boxes or polygonal types of areas. Such defined areas are saved as part of the definition of the particular camera.

Step 11. Compare Images and Generate Difference Images Attributes, Queue Label Analysis An embodiment compares incoming images with those proceeding to identify significant motion. In an embodiment, motion areas may be weighted and indexed, e.g. in a Quad Tree data structure, for subsequent label hit-testing. For purposes of discussion herein, 'label-hit testing' may be defined as the process by which interesting motion identified in a particular sequence of image frames is compared for intersection with the user's labeled regions of interest. For example, when the region containing the approaching postman is detected as the region of interesting motion, that region is intersected with the regions defined by the user as "walkway" and "front lawn". If the postman's motion region overlaps with both the "walkway" and "front lawn" regions of a particular frame, then the postman's motion may be considered a "label-hit" on "walkway" and/or "front lawn".

An embodiment may additionally generate label-hit analysis tasks. For purposes of discussion herein, 'a label-hit analysis task' may be defined as the analysis work unit required to determine how the interesting motion that overlaps with labeled regions of interest is classified. For example, when there are candidate matches identified by the overlap among regions with interesting motion and regions with labels defined by the user, a label-hit analysis task may be generated.

Step 12. Store Image Difference Analyses

In an embodiment, output of each image difference is stored. In an example implementation, such output may be stored in Quad Tree form in Google's High Replication Datastore.

Step 13. Store Label Hit Analyses

In an embodiment, a label hit analysis task queue is populated which defines the work unit(s) to be completed in comparing the image difference output with the stored user-labeled regions. In an embodiment a task is a unit of work scheduled for execution. The work performed by that work unit varies based on the actual computations needing to be done. In an embodiment, the task is stored using a GAE Task Queue that schedules execution with inputs referencing the datastore key of the image stored in Step 5. That unique datastore key is used to formulate the keys and retrieve the image differences stored in Step 12 and the labeled regions stored in Step 10.

Step 14. Analyze Label Hits, Queue Detailed Analysis

In an embodiment, for motion regions, e.g. as identified in Step 11 and stored in Step 12, with candidate label matches, as defined by Step 9 and stored in Step 10, judge the overlap among motion regions and labeled regions to determine whether more granular and possibly more CPU-intensive analyses are required to be performed. Thus, for example, the motion stored in the image difference Quad Tree may be searched for hits with each labeled region. In an embodiment, such Quad Tree hits each may be scored with weightings based on a plurality of factors. Examples of such factors may include but are not limited to the size of the matching region, the horizontal and vertical proportions of contiguous matches, ratings of previous analyses submitted by users, and patterns observed over time. For example, the output of a label-hit analysis may be represented with an overall motion size score and individually scored label hits that calculated the size of the motion region ('ms') and the size of the labeled region ('ls') represented in JSON as:

Motion: 2.343750, {u'front lawn': {'ls': 11.8489583333333334, 'ms': 0.0}, u'sidewalk': {'ls': 2.9947916666666665, 'ms': 0.0}, u'street': {'ls': 6.380208333333333, 'ms': 2.2135416666666665}, u'driveway': {'ls': 17.057291666666668, 'ms': 0.0}, u'walkway': {'ls': 11.979166666666666, 'ms': 0.0}}

In this example, the labeled regions 'front lawn', 'driveway', 'sidewalk', and 'walkway' had no motion (0.0) and the labeled regions 'street' contained nearly the entire are of motion (2.2135416666666665 of 2.343750)

Step 15. Determine Whether More Details Analysis is Required, Tier n+1?

In an embodiment, when the scoring requires more detailed analysis, then perform another iteration of the image difference task, i.e. return to Step 6, with work unit parameters that describe, for example, that the image diff be performed at higher resolution of 640×480 pixels rather than the previous 160×120 resolution. The work unit parameters are supplied as inputs to the task scheduled for execution using GAE Task Queue and may vary factors such as but not limited to pixel resolution used in analysis of specific bounding boxes, image filtering parameters, and the degree of effort in searching for contiguous regions. For example, if the motion overlapped small and closely aligned labeled regions, the new task request another pass at higher resolution by adding the task parameter &size=640×480. Or, if only a portion of the image needs higher resolution analysis, the parameters may be:

```
&size=640x480&regions=[{"top":"47.92%", "left" : "46.88%",
   "height" : "4.17%", "width" : "6.25%"}, {"top":"7.02%",
   "left" : "0%", "height" : "10.27%", "width" : "3.45%"}]
```

The degree of effort varies by factors such as the resolution of the image because higher resolutions require more CPU processing to compare large matrices, the timespan of the analysis, because considering a greater number of frames may require more computation, and the depth of the search for contiguous regions, as color comparisons and recursive search consume more CPU processing time. In an embodiment, measurement is performed in CPU, memory, and disk writes. One large factor in image difference analysis is CPU. As more CPU is used, more servers may be required to keep up with incoming stream of images. Thus, the embodiment tries to optimize the image analysis for accuracy without creating huge CPU/server costs.

When no further analysis is warranted, then the label hits may be processed as shown in Step 20 hereinbelow.

Step 16. Label Hit Analyses

In an embodiment, output of the last iteration of label matches are stored. For example, this represents in JSON a single label-hit on the labeled region "street":

```
{"motion size": 2.34375, "alerts": [ ], "label_hit_info": {"front lawn":
{"ls": 11.848958333333334, "ms": 0.0}, "sidewalk": {"ls":
2.9947916666666665, "ms": 0.0}, "street": {"ls": 6.380208333333333,
"ms": 2.2135416666666665}, "driveway": {"ls": 17.057291666666668,
"ms": 0.0}, "walkway": {"ls": 11.979166666666666, "ms": 0.0}}}
```

Step 17. Correlate Label Hits with Image Source

In an embodiment, label hits are correlated each with any one of the images sourced from a particular camera of a particular user. Such hits are correlated such that the user may view, review, and rate the resulting label-hit of the analyses and also the motion analysis prior to the label-hit analysis as described in Step 18 hereinbelow.

Step 18. Rate Analyses

In an embodiment, a user may select and rate particular regions of the motion labeling analyses. Such rating may provide training data that improves the accuracy of subsequent analyses. Because particular imagery may be private and viewable only by a particular user owning the surveillance imagery, it should be appreciated that such human feedback provides judgment from perhaps the sole person able to judge the quality of the automated calculations.

Step 19. Store User-Rated Analyses

In an embodiment, such ratings submitted by the user may be stored, e.g. for use in subsequent analyses.

Step 20. Process Label Hits

In an embodiment, resulting labeled motion analyses are indexed for the organization and presentation of labeled motion. Also, create and queue tasks triggered by label hits including but not limited to sending notifications to users.

Step 21. Populate Notification Task Queue Storage

In an embodiment, such notification task queue stores the work units to be completed by notifying users of the label matches via various communication channels. Examples of such various communication channels may include but are not limited to instant message, email, and placing in a particular inbox, each according to preferences of each user.

Step 22. Send Notifications, Offer Option to Rate

In an embodiment, notifications may be sent via preferred channels of users. In an embodiment, such notifications may include links to the indexed labeled motion in HTML or include data encoded and delivered over any other protocol like UDP or XMPP. In an embodiment, from any frame viewed, the user may rate the accuracy and relevance of the labeled motion either explicitly with a rating action, or implicitly with actions such as but not limited to clicking, playing, hiding, deleting, or saving a particular frame.

Figure 2:
FIG. 2 is a sample screen shot illustrating an example of significant motion detected between two video frames, according to an embodiment.
Figure 3:
FIG. 3 is a sample screen shot illustrating an example of significant motion detected between two video frames, according to an embodiment.

FIG. 2 and FIG. 3 each represent an example frame of two sequential frames. Together, such frames illustrate significant motion labeled in the two sequential frames from one camera. For example, in FIG. 2 a person is detected on the sidewalk 201 and a dog is detected on a different part of the sidewalk 202 as well. In FIG. 3 the person has moved since the frame of FIG. 2 and is now detected further along the sidewalk 301 and the dog is detected on the lawn 302.

In an embodiment, by subtracting transformations of the previous frame, e.g. as detected at 201 and 202, from the current frame, e.g. as detected at 301 and 302, and applying filters to reduce unwanted motion from, for example, blowing leaves and moving branches, the dog may be labeled as motion on the "front lawn" and the person may be labeled as motion on the "walkway".

Thus, FIG. 2 and FIG. 3 show the difference between the prior frame and the subsequent frame. The yellow highlights are an example of what changed, such as if an individual was viewing the dog and the person.

Figure 4:
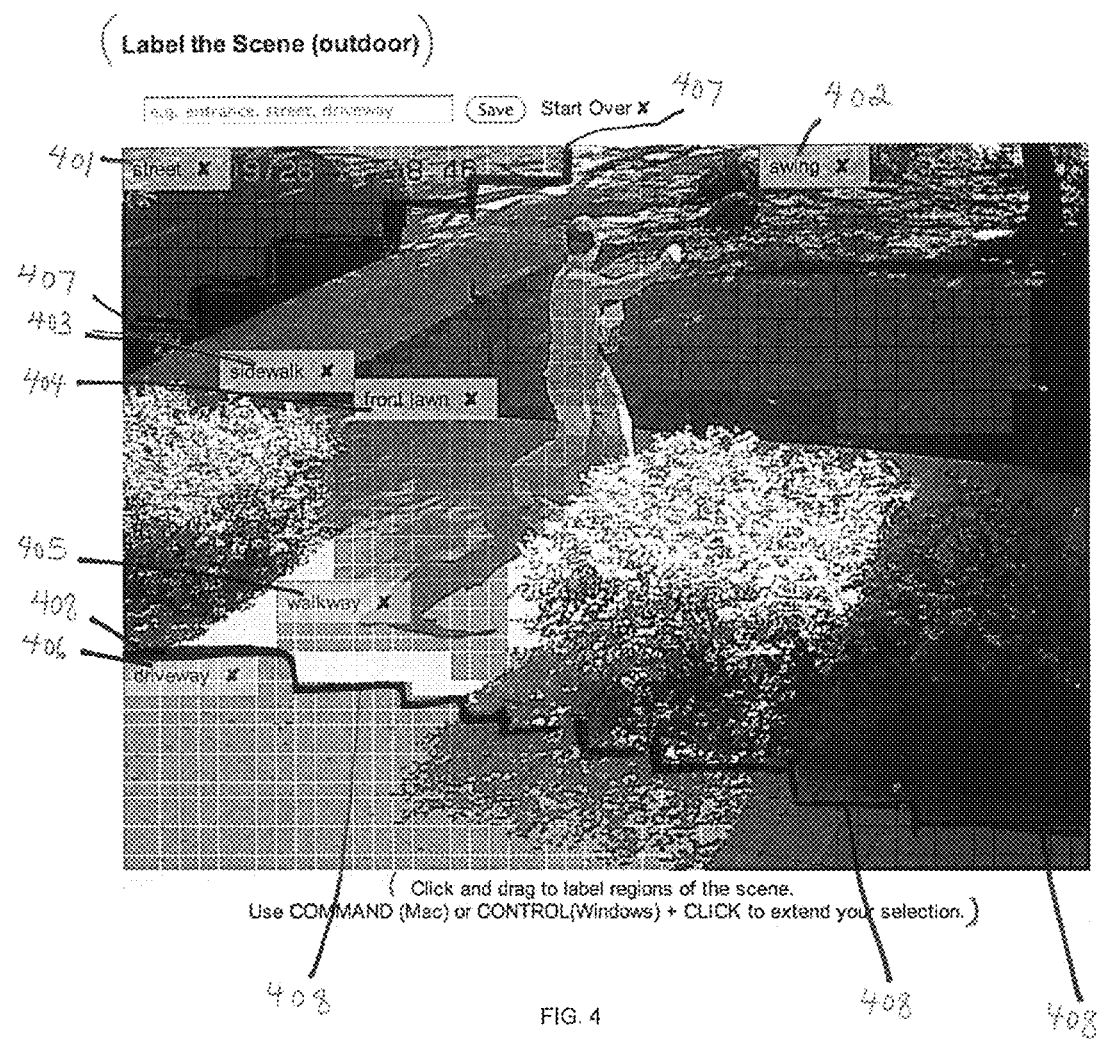
FIG. 4 is a sample screen shot of a view of labels defined by the user for regions of the scene being monitored, according to an embodiment.

FIG. 4 illustrates a user-labeled camera scene. In an embodiment, a user may select any contiguous or non-contiguous regions of a scene and assign a label. Typically, such labels may be used for characterizing interesting motion in the scene, specifying preferred notification rules, and for reducing the computational costs of image analysis. For example, in the screen shot of FIG. 4, a user provided the following labels: street 401, swing 402, sidewalk 403, front lawn 404, walkway 405, and driveway 406. It should be appreciated that such labels are way by example and are not meant to be limiting.

In an embodiment, regions may also be specified or defined. Examples of specified regions may be understood with reference to FIG. 4. A street region is specified by a step-like boundary 407. As another example, a driveway region 408 is also shown as bounded by a step-like boundary. Again, such examples are for illustrative purposes and are not meant to be limiting.

Rather than requiring any specialized client applications, an embodiment enables a user to use any web browser to draw such labeled regions. For example, in an embodiment, regions and labels may be drawn as HTML or Cascading Style Sheets (CSS) overlays on top of the image. For purposes of discussion herein, an overlay may be defined as percentage offsets from the edges of an image such that label-hit analysis may be performed at any pixel resolution, e.g. for computational efficiency.

Figure 5:
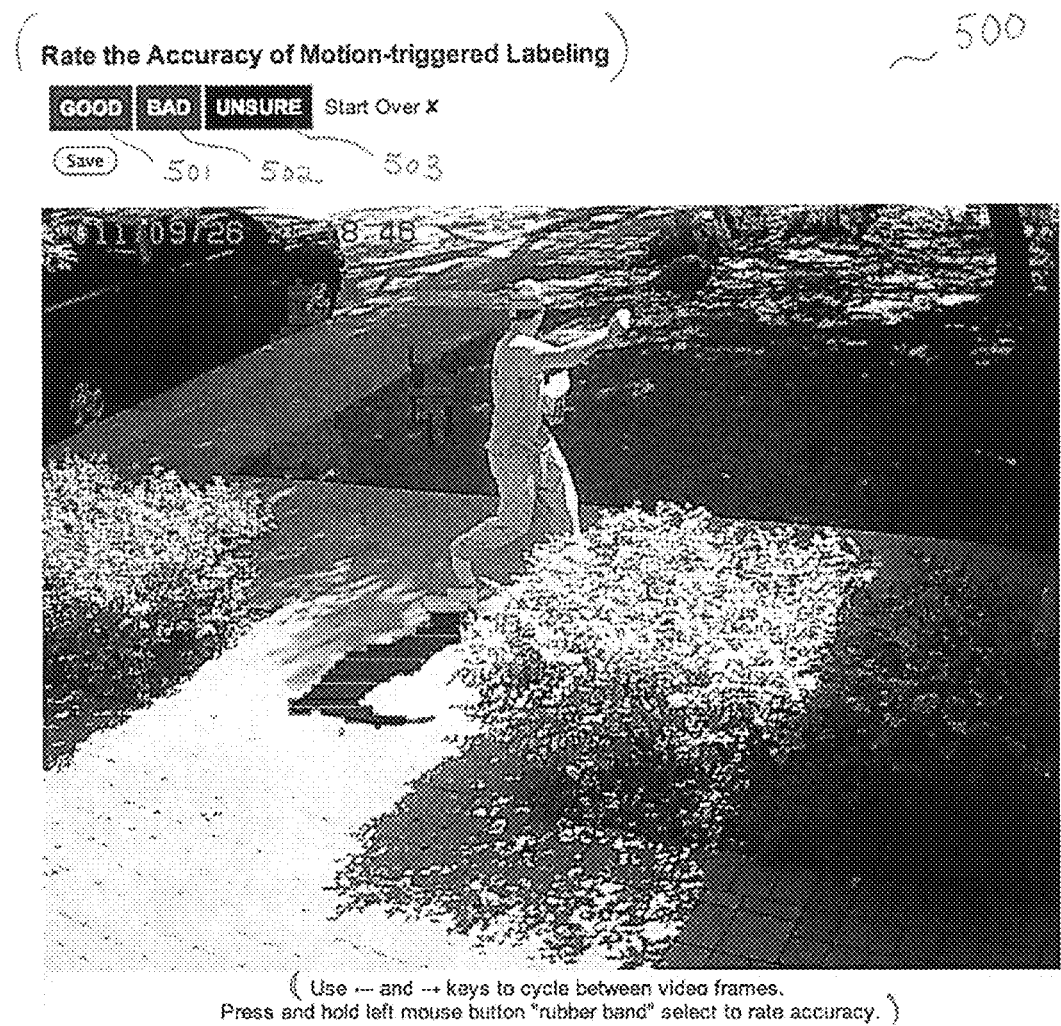
FIG. 5 is a sample screen shot of a view of a mechanism for a user to rate the accuracy of significant labeled motion, which provides training data for optimizing precision, relevance, and efficiency, according to an embodiment.

FIG. 5 illustrates a mechanism by which a user may provide an explicit rating of labeled motion in a frame, according to an embodiment. In this illustration, which is not meant to be limiting, a particular frame 500 is provided. Also provided in frame 500 are three buttons that may be selected to indicate whether such frame depicts an accurate triggering of motion. In frame 500, a GOOD button 501 is provided such that when it is selected, a learning process provided in an embodiment, may use such selection as input for improving accuracy of detecting significant motion. As well, an embodiment may provide a BAD button 502, which when selected indicates that the frame does not accurately indicate significant motion. As well, an embodiment may provide an UNSURE button 503, which when selected indicates that it is not clear whether the frame accurately indicates significant motion. It should be readily apparent that the particular details for indicating accuracy of motion are by way of example and that a wide variety of implementations are contemplated.

Further according to FIG. 5, a user may select portions of the motion identified as significant. For example, as shown at the bottom of frame 500, a user may "rubber band" select a collection of frames, for example, by using arrow keys in conjunction with pressing and holding the left mouse button. In the embodiment, when the user characterizes relevance and accuracy of such portion of the labeled motion, such characterizations may be as an input training signal for future analyses. Though there also may be implicit training signals, e.g. clicks to play labeled sequences, drill-downs on specific labels and times, etc., such explicit feedback also may be important because a particular user, e.g. the owner of the camera, may be the only human or entity authorized to view or be presented with the analysis results and judge or determine their quality.

Large-Scale Labeling

An embodiment provides a large-scale labeling process of labeling camera images, where large-scale labeling of hundreds of thousands of input or arriving images is performed. In an embodiment, such large-scale labeling may be achieved by the herein described steps around performing the differences and labeling motion and images. It should be appreciated that such large-scale labeling process may be performed in real time with cloud-based processing at an economical price by the way that the problem is segmented in accordance with an embodiment. Real-time labeling of significant motion in frames is provided in such a way that may scale to hundreds of thousands of cameras, which is not provided presently by the prior art.

Thus, in accordance with an embodiment, any digital camera may be used. That is, such camera used in embodiments herein are not required to be loaded with particular intelligence around recognizing objects, such as a person or a car. Such cameras with such built-in intelligence require particular processing, which creates more expensive cameras that may not adapt and learn over time. Thus, embodiments herein allow using "dumb" or "stupid" cameras, e.g. without particular intelligence such as recognition intelligence. Thus, with such cameras that do not require such built-in intelligence, images are transmitted to a server, such as on the cloud. Such images are labeled with significant motion in the cloud, economically and at scale.

Camera

Embodiments herein use cameras that are configured to trigger an event. Examples of such types of events that get triggered may include blowing leaves, shadow changes, bugs, all kinds of night spiders, etc. Thus, in an embodiment, cameras are allowed to send forms of events that matter to the camera or, put another way, per the configuration of the individual camera.

Token

In an embodiment, a camera is provided with a token that permits the camera to upload only to the user's account without also granting access to the user's account. Put another way, an embodiment provides a token that enables contribution of content, e.g. but not limited to video, images, and audio, without giving the camera the ability to sign-in to the user's account, which may be a security risk. Such token may be considered to provide a type of security mechanism and may serve to provide such consumer-device cameras with a security mechanism that is otherwise nonexistent. Thus, in an embodiment, a camera uploads one or more images to a particular account without having to have access to the account, however upload using the token. In an embodiment, the camera receives such token by way of a configuration of the camera that just indicates to upload to a directory. For example, an Upload Token may include encrypted elements like the user id, date created and secret used to encrypt a token that may look as follows:

AQCH1tA8Jf6yldAnzb6JdyzEj1Xt6TcoeUB76ha-DaXDzl3F or a shortened form like:

ic9t69

Figure 15:
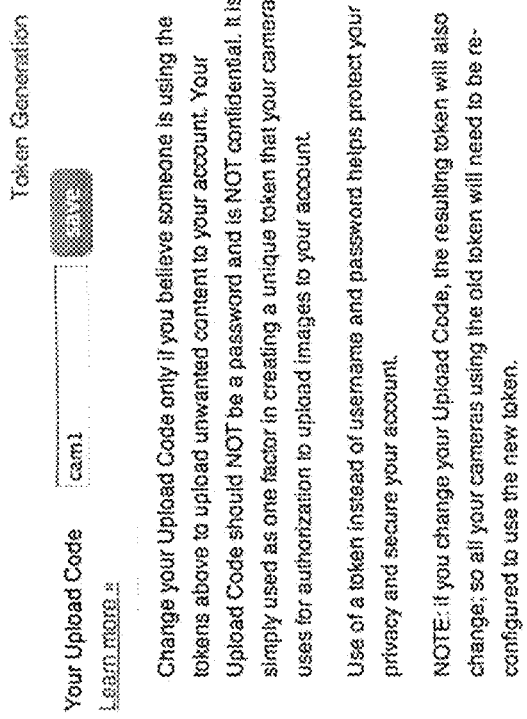
FIG. 15 is a sample application window for generating a token, according to an embodiment.

For example, instead of a camera having to know conventional user names and passwords, such cameras have this token that is used to upload. It should be appreciated that in an embodiment, if someone were to steal the token, a new token may be reissued. For example, the user generates a new Upload Token by entering a new Upload Code such as "my secret" that is used as one of the inputs to create the new encrypted Upload token. An embodiment may be understood with reference to FIG. 15 showing an application window which a user may use to generate a new token.

Thus, using the provided token separates the permission to upload from the permission to access and view content. Thus, such token provides the consumer electronics with more security because the device is not given the permission to actually access the particular account.

Cache

In an embodiment, caching may be part of contributing to the scalability aspect of the video surveillance scheme provided herein because such caching allows for receiving tens of thousands of images when it is not reasonable to assume that such images may be read and written to disk, or repeatedly transformed in various matrix operations, much of the time. Thus, embodiments herein facilitate keeping a buffer of incoming images in a fast cache that makes it more cost effective and fast. It should be appreciated that another part of the cache advantage is that intermediate analysis products, such as but not limited to the matrix representation of an image split into RGB color space, may not have to be re-created again for the comparison with subsequent frames.

Segmenting

An embodiment provides a pipeline process that takes what is usually a very expensive computation and segments such computation into smaller tasks such that such computation and other related processes may scale across a large number of cameras. Thus, embodiments herein allow performing video surveillance which had typically been performed on either a dedicated processor on a camera or a dedicated processor in some kind of data center and, instead, segmenting the whole process into smaller tasks that can performed efficiently at scale.

Image Difference Task Queue

In an embodiment, an image difference task queue contains a sequence of images to be compared. A processor determines a delta between the two images with the objective of identifying one or more significant objects that may have changed. An embodiment may be configured to determine a significant change versus an artifact such as blowing leaves or shadow changes, etc. For example, when blowing leaves on a sunny day cast many small shadows on the lawn, a simple image difference between two images would produce lots of "false-positive" motion since the light and dark spots on the lawn may change each second. An embodiment may instead be smarter about masking irrelevant motion by noticing patterns in motion across the prior frame sequences, analyzing hue variations, and learning patterns specific to but not limited to the camera source, time of day, and location.

Time Sequencing

An embodiment provides an efficiency of the cache and normalizing of time stamps across the incoming images. Such efficiency and normalization are important because cameras may have varying time stamps and the cameras may be in communication with different servers. An embodiment takes such disparate data corresponding to the images and places such images based on the data onto a common timeline, thereby establishing a time sequence. For example, a camera whose clock is two minutes fast, is not adjusted to daylight savings time, and is not set to the right time zone may be corrected by but not limited by the following: noting the server timestamp at the time the image transfer began, the timestamp of the image storage, and the deviation among those timestamps and the timestamp supplied in the filename of the image uploaded by the camera source. Typically, the server timestamps alone may correctly sequence the images. However, when many images arrive across many servers with varying processing loads, connection bandwidths, and disk write latencies, an embodiment corrects sequencing errors by observing the discrepancies between the known-consistent server timestamps, e.g. in Greenwich Mean Time (GMT), and those reported by the camera source itself. Thus for example, when the camera's filename is /front/MA__2012-09-24__16-01-17__178.jpg and the upload began at GMT timestamp 2012-09-24T23:04:23.454684 and the server stored the image at 24/Sep/2012:16:04:28-0700, the system may recognize that the camera source is consistently three minutes and five seconds behind.

Thus, it should be appreciated that such frame sequence cache is important for the efficiency as well as for the time sequencing of images from the same cameras. Time sequencing of images from the same cameras is important because a plurality of servers may be fielding the incoming images, which may be processed at different points in time.

In an embodiment, even when frames samples may be only a second apart, part of the role of the cache sequence is to keep the frames in order such that they may be compared, e.g. from T0 to T1 to T2 in terms of time.

Thus, an embodiment keeps an efficiently-sequenced set of images ready to be compared.

Regions/Zones and Labels

Figure 8:
FIG. 8 is a sample screen print from a first camera of a house showing zone definitions, according to an embodiment.
Figure 9:
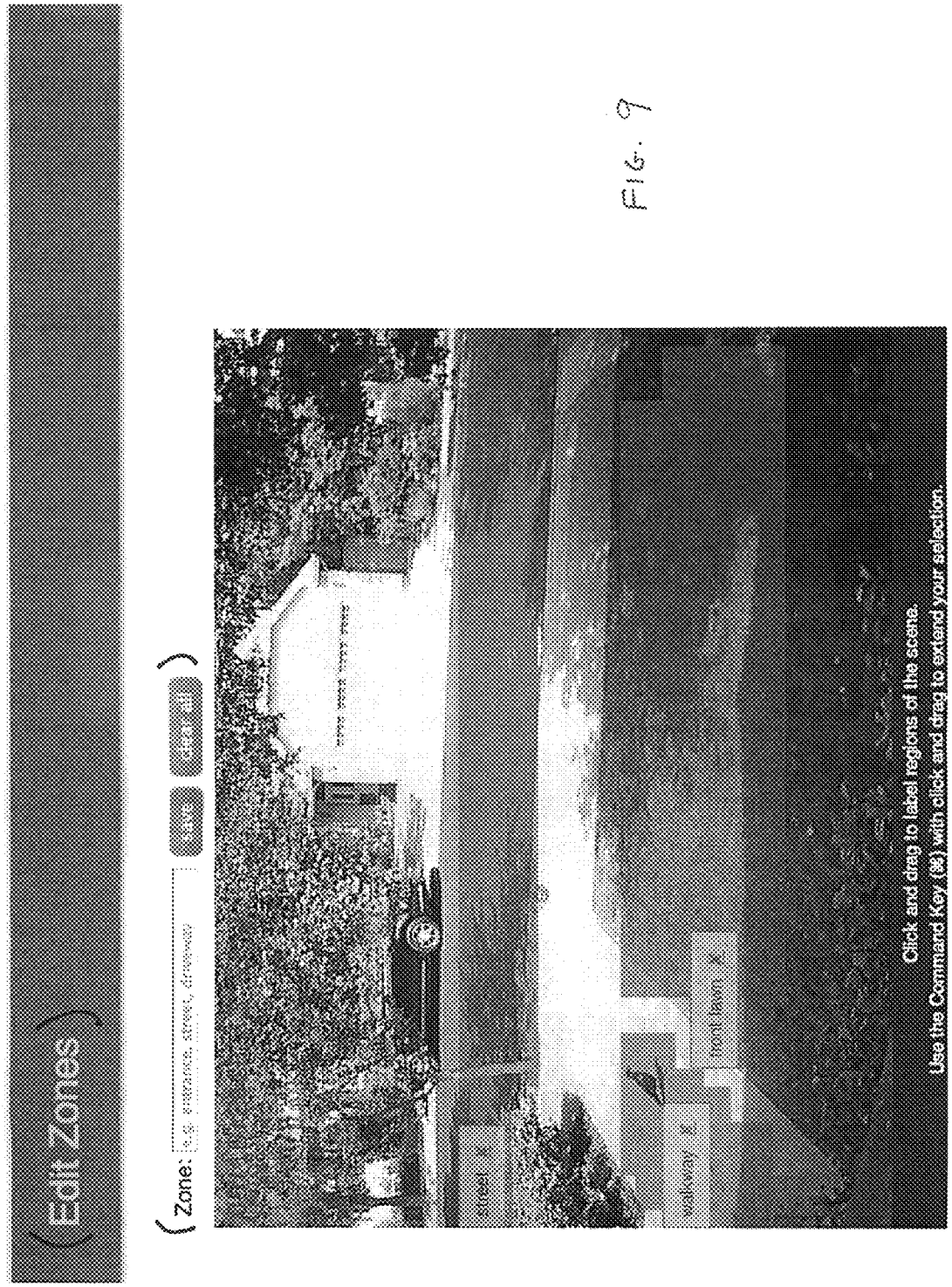
FIG. 9 is a sample screen print from a second camera at the front of the house in FIG. 8 showing zone overlap, according to an embodiment.

In an embodiment, before receiving images for monitoring a scene, a user may designate, e.g. from a browser or from another application window, certain regions of the camera's view thereby creating different zones or regions of a scene. Examples of such zones may include but are not limited to walkway, doorway, front yard, and so forth. Importantly, embodiments herein enable labeling such regions in the browser or other client window. Examples of screenshots showing how zones may be designated and labeled are shown in FIG. 8 and FIG. 9. In these examples, FIG. 8 is a sample screen print from a first camera of a house showing zone definitions, according to an embodiment. FIG. 9 is a sample screen print from a second camera at the front of the house in FIG. 8 showing zone overlap, according to an embodiment.

Following are examples showing both a sample html markup and a reference to the JQuery and CSS used to style the overlay on top of the image.

For example, a recently received camera image is presented to the user in an HTML page that includes an overlay grid. The overlay grid is a series of <div> tags distributed on top of the image and selectable by mouse or touch via JQuery operations on the CSS-styled <div> tags. For example the definition of the "walkway" zone might look like:

```
<div class="m1 blockSAVED s-walkway"
    style="left:0%;top:66%;width:2%;height:2%;"></div>
<div class="m1 blockSAVED s-walkway"
    style="left:0%;top:68%;width:2%;height:2%;"></div>
<div class="m1 blockSAVED s-walkway"
    style="left:0%;top:70%;width:2%;height:2%;"></div>
etc...
```

When the user saves the defined zone, the browser sends the selected <div> tags to the server for interpretation and storage as a labeled zone. Thus, an embodiment allows a user from any camera to view a sample image of a scene and define which parts of the image to be labeled. An example may be understood with reference to FIG. 4, which presents a sidewalk, front lawn, swing, and walkway, which are labeled regions of the scene.

Correlation of Labeled Regions with Motion

An embodiment receives incoming image and may determine from which user and camera the image arrived. For example, an uploaded image may arrive with the server path such as but not limited to:

```
/upload/AQD5IAMiXDMjfMwHd0yvjKIa0YPoAqJ2jhbYfXEIILTw/front/
MA__2012-09-24__16-01-17__178.jpg
```

Such path is translated into a unique camera source owned by a distinct user by:
 a) deciding the encrypted upload token to verify the user id; and
 b) noting the camera source name in the path (e.g. "front").

Subsequently, the system may correlate labeled regions corresponding to the incoming image with motion observed from the camera, based on the incoming images. For example, an embodiment may detect that there is somebody walking on a walkway. In an embodiment, boundaries of the defined regions are detected and are intersected with the motion that happened for that camera image.

In an embodiment, images arrive with an encrypted token and the system reads the token to determine the original user and camera. Having determined the original user and camera, the system may retrieve the labeled regions that the user had previously defined. For example, after decoding the Upload Token to determine the user id and concatenating that user id with the camera source name, such unique combination is used as the datastore key to retrieve any labeled regions defined for that camera source.

Perform Difference

An embodiment compares at least two images, e.g. a first image and the image immediately preceding it. The embodiment subsequently identifies significant motion and subsequently weights whether such motion is in a particular region more than another. For example, as discussed hereinabove an example is described about considering the size of the motion region in comparison to the size of the labeled region to determine how much of a "hit" there is, e.g. the 'ms' and 'ls' json example. Thus, for example, if a person on the images is mainly walking on the walkway, then the system may weight such motion and score such motion to indicate mostly a walkway hit. Put another way, an embodiment may determine the motion as an event that happened on the walkway. Thus, an embodiment analyzes or executes work in comparing the image difference with user-labeled regions. For example, such image difference may be presented on an image by yellow blocks, such as for example yellow blacks 302 for the dog in FIG. 3.

Thus, in an embodiment, such image differences are further compared with knowledge of what regions there are in the scene.

Significant Motion

An embodiment may be understood with reference to FIG. 2. FIG. 2 shows the significant movement area that was identified by the system. In the figures, the significant movement is depicted as the yellow pixels on the top of the dog pixels.

In an embodiment, determining significant motion may be separate from and independent of the region in which the motion happened. Determining significant motion may involve obtaining a clean signal for movement, e.g. for the dog having moved. Getting a clean signal for movement may be important because there may be a large number of other smaller movement, e.g. lights on a lawn, which may be considered insignificant. For example, FIG. 2 shows other smaller highlighted pixels or spots on the lawn. Thus, embodiments herein present significant motion blocked out such that an observer may know what is of interest on the scene.

Figure 10:
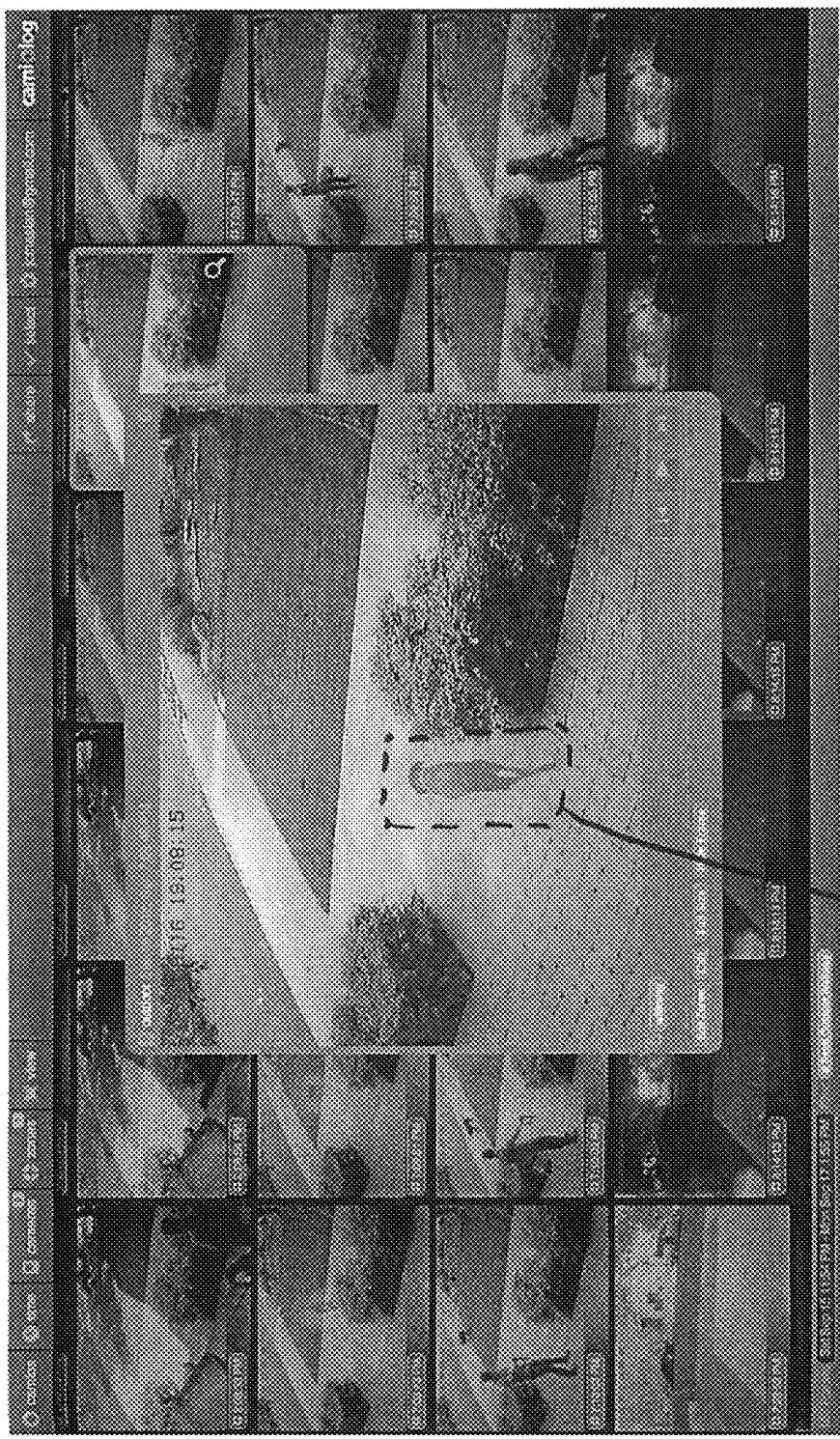
FIG. 10 is a sample screen print of a dog in which the dog is overlaid with an orange vapor cloud indicating significant motion on the walkway, according to an embodiment.

Another example is provided in FIG. 10. FIG. 10 is a sample screen print of a dog in which the dog is overlaid with an orange vapor cloud 1002 indicating significant motion on the walkway, according to an embodiment.

Weighted Analysis

Referring to FIG. 2, embodiments herein may answer the following questions. Now that the dog is identified, where is the dog? Is the dog on the sidewalk or on the lawn, such as in FIG. 3? In FIG. 2, a small part of the dog is on the lawn. However, the dog is mainly on the sidewalk. Thus, weighted analysis provided by embodiments herein may determine that the object, e.g. dog, is mainly on the sidewalk. Thus, in an embodiment, such determination is classified as a sidewalk hit rather than a lawn hit. Thus, an embodiment performs a comparison and weights detected motion scores. Again, the JSON examples of 'ms' and 'ls' hereinabove may apply.

Thus, embodiments herein reduce some of the noise and record where the significant motion is in the particular scene, such that such motion may subsequently be compared with the labeled regions that the user defines. Thus, an embodiment performs the difference between the images and defines the next unit of work, which is to intersect the detected motion with the labeled regions.

Figure 13:
FIG. 13 are sample screen prints of labeling motion as interesting even without defining zones, according to an embodiment.

In an embodiment, such motion may be interesting in and of itself, without having to be compared with labeled regions. An example can be understood with reference to FIG. 13, sample screen prints of labeling motion as interesting even without defining zones, according to an embodiment.

Storage

In an embodiment, the image difference data structure is stored, in nonvolatile or volatile memory, on disk, etc. Examples of data representations that may be used include but are not limited to Quadtrees, matrices, and JSON, which are known in the art and not need be further taught herein. It should be appreciated that other storage technologies that provide for fast retrieval are contemplated herein. In an embodiment, storage representations that are most efficient for the particular use, e.g. to avoid parsing JSON when, instead, a matrix may be stored in raw form, may be used.

Exemplary Scaling Technique—Iteration

An embodiment analyzes a hit and decides whether more extensive analysis is required further to refine the given hit analysis. Such analysis is part of the scalability provided by embodiments herein. In an embodiment, a crude analysis is performed initially to determine whether any motion of interest is happening in a scene. In such case, the motion or image may be ignored. By ignoring such image, a large amount of computation doing advanced calculations may be avoided. Thus, the preliminary hit analysis is observed and subsequently and based therein the embodiment decides whether a more detailed analysis to further refine the assessment is required.

In an embodiment, when further analysis is required, previous steps are performed again in an iterative manner. For example, a particular scene may present an hour and a half of blowing willow trees and the end user may mainly want to see the mailman arrive. If the system simply performed an image difference from one frame to another, based on comparison alone, one may conclude that there is some motion happening that should be reported. However, when the computed data is observed over an interval such as for example the last 15 minutes, it may be determined that there is a general pattern of blowing leaves that should be ignored because blowing leaves may not be interesting in comparison to a person walking up the sidewalk.

Thus, embodiments herein provide an iterative algorithm for obtaining more detailed analysis in addition to simply performing a diff between the prior image and the existing image.

Present Matching Motion

Figure 11:
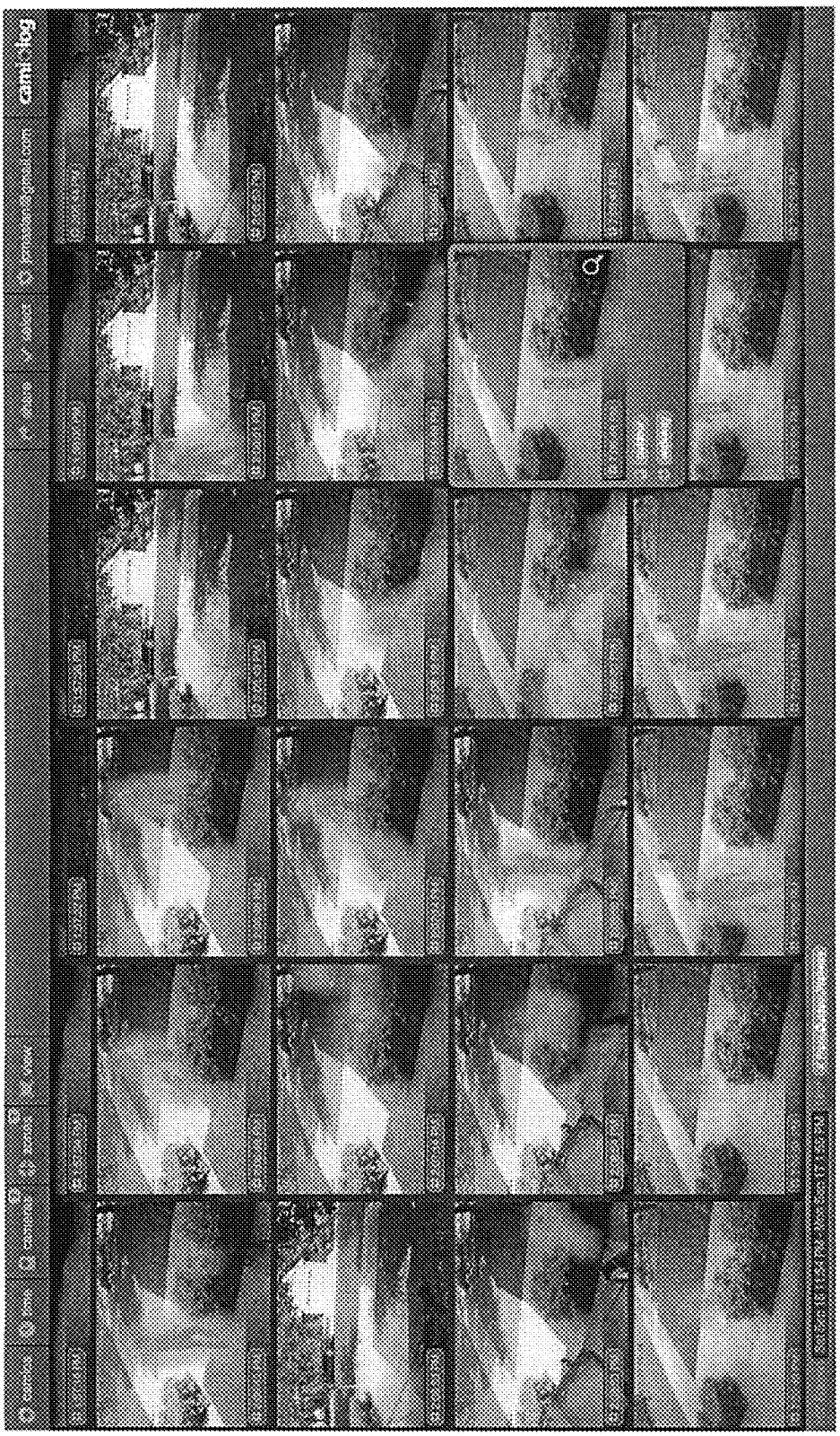
FIG. 11 are sample screen prints of a typical walkway day, according to an embodiment.

An embodiment presents to an entity, e.g. an end user, what was triggered, e.g. which labels were hit by motion in a particular scene. An embodiment provides displaying to the user the motion that matched a particular zone. In an embodiment, an end user may determine whether the algorithm made a correct hit or not. As an example, a displayed scene may contain an orange vapor cloud that show where the motion was. Further, an embodiment provides the given label name to that region. An example of presenting matching motion is shown in FIG. 11, sample screen prints of a typical walkway day, according to an embodiment.

Feedback Loop

It should be appreciated that in an embodiment, no entity other than a person authorized to access a particular account has access to images on such account. That is, embodiments are not configured to allow other people to see account user's images. Thus, an embodiment provides a process by which end users may give feedback, e.g. for the purposes of improve the algorithm(s).

In an embodiment, regarding the weighting of the analysis, when a user views how the system both identified the motion and matched it with a region that they defined, the user may rate the accuracy of the identification or the matching. It should be appreciated that FIG. 5 provides one example of a rating mechanism. However, embodiments herein provide a variety of ways to give feedback. One embodiment allows a user to donate images indicating that these particular images were badly rated and to please review them. In an embodiment, a user may hide an image to indicate that such image was not useful. The system may consider hiding an image as an implicit signal that the user did not like the image and thus it must not have been that interesting.

In an embodiment, improved, higher-volume feedback is obtained from regular usage by end users of the system when end users may simply indicate no, not right, hide, or donate. The basic challenge addressed by embodiments herein is that no representative of the system is allowed to view an image unless end users donate sample images of where the system may have made an incorrect hit.

Thus, an embodiment provides an invisible feedback loop where part of the training of the algorithm is end user's hiding and donating of images as well as their actions of viewing the images.

Thus, embodiments herein provide rating analyses that may incorporate explicit feedback that a user gives as well as implicit feedback, whether or not the end user clicked an image, played a sequence, saved an image or sequence, shared an image or sequence, etc. Ends users may tell the system how accurately it is performing even when the system does not receive the images. Such embodiments allows the labeling of images for millions of cameras when the embodiments are not legally or otherwise able to view them and provides a particular feedback mechanism that allows such labeling at scale. An embodiment allows improvement over time.

Hit and Notification

An embodiment provides a process which when a hit has been determined indexes the corresponding image having movement in the zone. For example, when a particular frame has a "hit" in the zone "walkway" and "entrance", both of those hits are indexed in a "labels" field in Google's High Replication Datastore so that queries on the field "labels" execute very quickly in finding all frames containing those label hits. An example of an implementation of such datastore is shown in FIG. 14.

For example, when a dog comes onto a lawn, e.g. in FIG. 3, such image gets indexed as lawn, as an event in lawn. As well, a corresponding notification that an event occurred on the lawn is queued in a notification queue for the user. Such notification may be transmitted via a variety of protocols including but not limited to email or instant message. In an embodiment, such notifications may be integrated with alarm companies and other industries that may trigger alarms.

Thus, an embodiment processes notification tasks that result from the matched zone.

Figure 12:
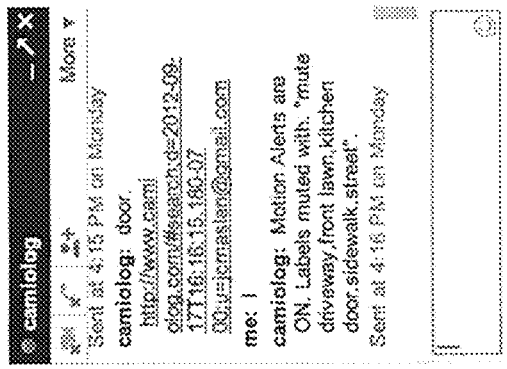
FIG. 12 is a sample message box of a label notification, according to an embodiment.

An example of a label notification can be seen with reference to FIG. 12, a sample message box of a label notification, according to an embodiment.

Smart Labeling—Significant Motion and Zone Hits

An embodiment provides a classification technique which includes automated labeling at scale for either or both of significant motion and zone hits. For example, an embodiment may provide a label for zone hits for humans anywhere near a house. It should be appreciated that in the example such labeling may not be zone specific, but just human specific. In another example, such labeling may be dog specific. In another example, an end user may create a label called, "people-animals on my front lawn," which has a zone and a motion aspect. Thus, embodiments herein may include any of the possible combinations of motions and zone hits.

Thus, embodiments herein provide smart labeling of any motion from surveillance. In an embodiment, smart labeling may be a combination of factors including but not limited to zone hits, type of motion, speed of motion, direction of motion (e.g. advancing towards the house or moving away), similarity of motion across cameras in the same location or geographic region, time of day, time of year, weather conditions, hue changes, geometric shape of motion patterns (e.g. stringy spider webs or streaking rain), luminosity changes, dispersion of motion, size of motion, contiguous regions of color or motion, deviation from normal scene patterns, etc.

It should be appreciated that embodiments herein provides one or more instantiations of the system that are focused on significant objects of motion and the intersection of such with labeled regions. However, embodiments may include other types of analyses of motion in a scene and how to arrive at a label for that motion. For example, motion may be classified by but is not limited to its weather conditions (e.g. "windy day", "sunny day", "rainy day" as judged from the motion patterns), its color (e.g. "pretty sunset", "puffy clouds"), its speed, direction, etc.

An embodiment recognizes patterns of motion and allows for labeling of such patterns of motion. As an example, a label may be defined such that an end user receives a notification when a spider web is being built in the particular scene. In this embodiment, the pattern of motion is detected independently, without using any data about an intersection with a zone, as the zone has nothing to do with the pattern of motion. It should be appreciated that much of the work transforms images into representations that help identify the pattern the system is trying to isolate. The above is a good example because the transform does a good job of detecting spider webs. For example, this embodiment uses Hue Transforms to identify stringy spider webs that are reflecting infrared light of the camera in a "stringy" pattern. The Hue Transform helps identify and threshold the detection of "stringy" webs at night.

An embodiment enables labeling the results of different smart analyses. For example, a user may want a labeled notification confirming that his grandmother is living alone independently and safely by defining a label as a combination of factors such as but not limited to: a zone hit at the "coffee maker" between the hours of "8 am-10 am" of a "human sized object" for duration of "more than 2 seconds". An embodiment not only reduces noise levels, but allows intelligent labeling decisions while looking at or analyzing the motion.

Exemplary Use Cases

Some example implementations of embodiments may include but are not limited to the following.

Construction Site Monitoring

In an embodiment, contractors often must leave valuable tools, materials, and vehicles on job sites unattended and at risk of theft. An embodiment enables contractors to place an inexpensive camera on site to receive instant notifications of, for example, after-hours movement of such tools, materials, or vehicles, which may include: a tractor, toolbox, or stack of copper pipes. Such contractors may be able to jump with one-click to a specific video segment that captured that a particular labeled motion corresponding to the after-hours movement of such tools, materials, or vehicles.

Senior Independent Living

Older people often prefer to live independently though their family's concerns over health and safety of undetected accidents or health incidents may push them towards assisted living. An embodiment enables an inexpensive camera to be placed in a routinely trafficked area of the home such that the camera may operate as a monitor for confirming that normal routines of the person living independently continue. For example, the refrigerator or coffee maker may be labeled in the image in such a way such that family may be notified when "grandma has not opened the refrigerator/coffee maker this morning." Thus, such labeling may provide an early warning or added assurance.

Vacation Home Monitoring

It should be appreciated that unattended vacations homes prompt concerns for owners. For example, an owner of a vacation home or any home may worry and ask himself or herself "did the pipes burst with the recent cold spell?", "are there unexpected intruders at our place?", "who has entered the house in the last 3 days?" etc. Embodiments herein may enable home owners or even renters to browse quickly through significant motion in particular specific areas of interest without having to go through hours of video.

Neighborhood Watch

In many communities reduced budgets may mean police must prioritize investigations. For example, police may prioritize by the severity of a crime and by likelihood of sufficient evidence that may lead to conviction of criminals. Embodiments provided herein may be used to assist security surveillance recording by allowing such recording to be accessible to many more entities, e.g. individuals, organizations, communities, etc., than at present. For example, neighbors may collaborate quickly to produce time-sequenced stitched video of event including but not limited to door-to-door solicitors for example that had been suspected of planning burglaries. In an implementation, such event or events may have been labeled with "walkway" motion.

An Example Machine Overview

Figure 6:
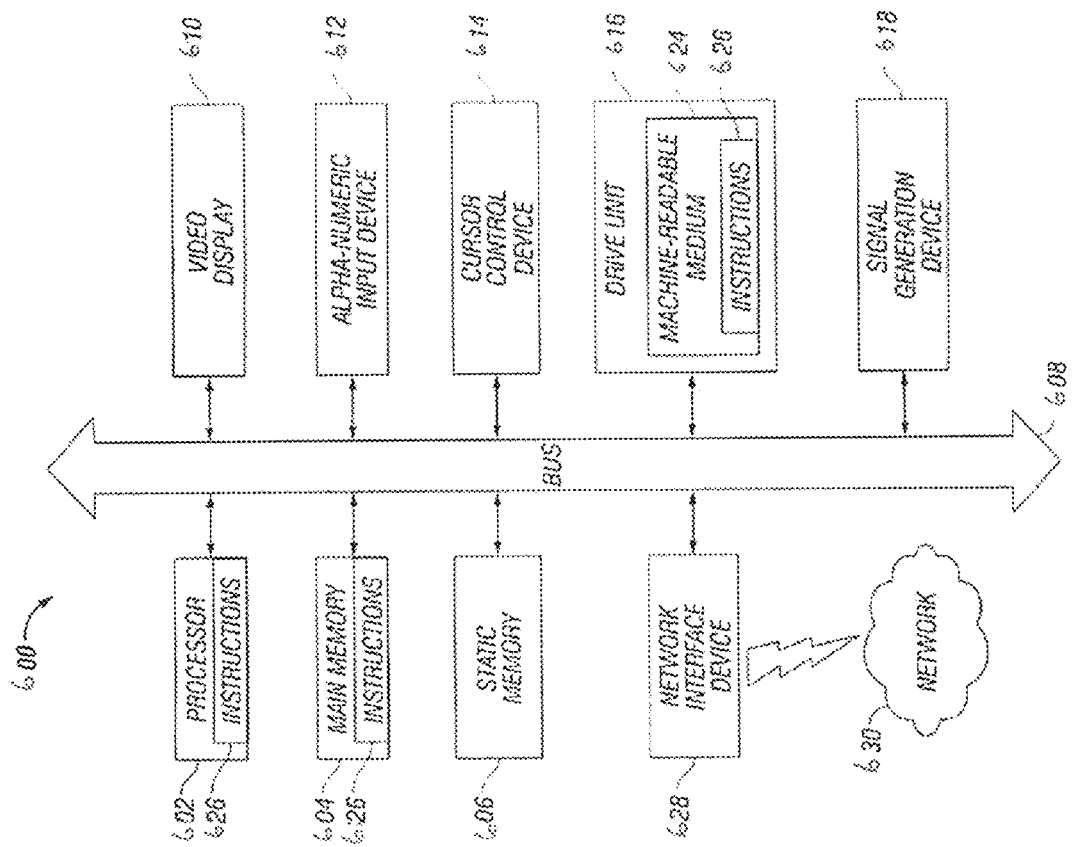
FIG. 6 is a block schematic diagram of a system in the exemplary form of a computer system, according to an embodiment.

FIG. 6 is a block schematic diagram of a system in the exemplary form of a computer system 600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 600 includes a processor 602, a main memory 604 and a static memory 606, which communicate with each other via a bus 608. The computer system 600 may further include a display unit 610, for example, a liquid crystal display (LCD) or a cathode ray tube (CRT). The computer system 600 also includes an alphanumeric input device 612, for example, a keyboard; a cursor control device 614, for example, a mouse; a disk drive unit 616, a signal generation device 618, for example, a speaker, and a network interface device 620.

The disk drive unit 616 includes a machine-readable medium 624 on which is stored a set of executable instructions, i.e. software, 626 embodying any one, or all, of the methodologies described herein below. The software 626 is also shown to reside, completely or at least partially, within the main memory 604 and/or within the processor 602. The software 626 may further be transmitted or received over a network 628, 630 by means of a network interface device 620.

In contrast to the system 600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to use an automated labeling of motion-detected event events at scale in video surveillance system on such internet-enabled or other network-enabled devices, servers, or clients. It further should be appreciated that one or more cloud computing embodiments include all or part of such automated labeling of motion-detected event events at scale in video surveillance system using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for smart labeling at scale of motion detected events in video surveillance, comprising the steps of:

at a server, labeling at least one zone of a source image, said source image from a source camera of a plurality of source cameras, and storing said label zone by:

receiving said source image with a corresponding upload token, wherein said upload token contains data identifying said source camera and an end user entity;

upon authorizing and using said upload token, presenting said source image to said end user entity for labeling; and receiving at least one label name of said at least one zone of said source image, correlating said at least one label name with said at least one zone for said source image, and storing said correlated labeled zone; and at a server in real time, processing label hits for incoming images from a plurality of source cameras, said plurality comprising said source camera, said processing by:

receiving and decrypting an encrypted token that uniquely identifies said end user entity and said source camera;

upon authorizing said decrypted token, receiving at least a first incoming image frame, and at least a second incoming image frame from said source camera;

comparing one or more objects on said at least second incoming image frame with one or more objects on said at least first incoming image frame and identifying significant motion based on said comparison, wherein significant motion is identified in part by computing a delta of change between any of said objects on said at least second incoming image frame and said objects on said at least first incoming image frame;

for each identified significant motion, determining a motion zone, wherein said motion zone is the zone of said at least second incoming image frame on which said significant motion overlays;

for each motion zone:

computing an amount of an overlap with a candidate labeled zone from said stored correlated labeled zones; and measuring said overlap among said motion zone and said labeled zone, determining therefrom whether further granular analyses are required to be performed, and performing said further granular analyses when required;

generating and indexing a label hit for each matching motion zone with candidate labeled zone; and generating tasks for each generated label hit;

wherein at least one of the steps is performed by a processor.

2. The computer-implemented method of claim 1, wherein said correlating said at least one label name with said at least one zone for said image source comprises translating said at least one labeled zone into percentage offsets from the edges of said source image.

3. The computer-implemented method of claim 1, wherein performing further granular analyses comprises:

performing another iteration by returning to said step of comparing objects wherein said comparing uses any of: pixel resolution in analysis of specific bounding boxes, image filtering parameters, and degree of computational effort in searching for contiguous zones.

4. The computer-implemented method of claim 1, wherein a task of said generated tasks is sending a notification to the end user entity.

5. The computer-implemented method of claim 1, wherein label hits are correlated each with any one of source images sourced from a particular camera of a particular user and wherein the user is able to perform any of: view, review, and rate the accuracy of said label hit.

6. An apparatus for smart labeling at scale of motion detected events in video surveillance, comprising:

a server adapted to label at least one zone of a source image, said source image from a source camera of a plurality of source cameras, and to store said label zone by comprising:

a receiver adapted to receive said source image with a corresponding upload token, wherein said upload token contains data identifying said source camera and an end user entity;

an authorizing processor adapted to authorize said token;

a presenter adapted to present, using said token, said source image to said end user entity for labeling;

a receiver adapted to receive at least one label name of said at least one zone of said source image, to correlate said at least one label name with said at least one zone for said image source, and store said correlated labeled zone; and a server adapted to process, in real time, label hits for incoming images from a plurality of source cameras, said plurality comprising said source camera, by comprising:

a decryptor adapted to receive and decrypt an encrypted token that uniquely identifies said end user entity and said source camera;

a receiver adapted to receive, upon authorization of said decrypted token, at least a first incoming image frame and at least a second incoming image frame from said source camera;

a comparing component adapted to compare one or more objects on said at least second incoming image frame with one or more objects on said at least first incoming image frame and identifying significant motion based on said comparison, wherein significant motion is identified in part by computing a delta of change between any of said objects on said at least second incoming image frame and said objects on said at least first incoming image frame;

a determiner adapted to determine, for each identified significant motion, a motion zone, wherein said motion zone is the zone of said at least second incoming image frame on which said significant motion overlays;

for each motion zone:

a computing component adapted to compute an amount of an overlap with a candidate labeled zone from said stored correlated labeled zones, and measure said overlap among said motion zone and said labeled zone, determine therefrom whether further granular analyses are required to be performed, and perform said further granular analyses when required; and a generator adapted to generate and index a label hit for each matching motion zone with candidate labeled zone, and generate tasks for each generated label hit.

7. The apparatus of claim 6, wherein said correlate said at least one label name with said at least one zone for said image source comprises to translate said at least one labeled zone into percentage offsets from the edges of said source image.

8. The apparatus of claim 6, wherein to perform further granular analyses comprises to perform another iteration by returning to said step of comparing objects wherein said comparing uses any of: pixel resolution in analysis of specific bounding boxes, image filtering parameters, and degree of computational effort in searching for contiguous zones.

9. The apparatus of claim 6, wherein a task of said generated tasks is sending a notification to the end user entity.

10. The apparatus of claim 6, wherein label hits are correlated each with any one of source images sourced from a particular camera of a particular user and wherein the user is able to perform any of: view, review, and rate the accuracy of said label hit.

11. A non-transitory computer readable storage medium having stored thereon a computer program for smart labeling at scale of motion detected events in video surveillance, said computer program comprising a program code which, when executed by a processor, performs the steps of:

at a server, labeling at least one zone of a source image, said source image from a source camera of a plurality of source cameras, and storing said label zone by:

receiving said source image with a corresponding upload token, wherein said upload token contains data identifying said source camera and an end user entity;

upon authorizing and using said upload token, presenting said source image to said end user entity for labeling; and receiving at least one label name of said at least one zone of said source image, correlating said at least one label name with said at least one zone for said source image, and storing said correlated labeled zone; and at a server in real time, processing label hits for incoming images from a plurality of source cameras, said plurality comprising said source camera, said processing by:

receiving and decrypting an encrypted token that uniquely identifies said end user entity and said source camera;

upon authorizing said decrypted token, receiving at least a first incoming image frame, and at least a second incoming image frame from said source camera;

comparing one or more objects on said at least second incoming image frame with one or more objects on said at least first incoming image frame and identifying significant motion based on said comparison, wherein significant motion is identified in part by computing a delta of change between any of said objects on said at least second incoming image frame and said objects on said at least first incoming image frame;

for each identified significant motion, determining a motion zone, wherein said motion zone is the zone of said at least second incoming image frame on which said significant motion overlays;

for each motion zone:

computing an amount of an overlap with a candidate labeled zone from said stored correlated labeled zones; and measuring said overlap among said motion zone and said labeled zone, determining therefrom whether further granular analyses are required to be performed, and performing said further granular analyses when required;

generating and indexing a label hit for each matching motion zone with candidate labeled zone; and generating tasks for each generated label hit.

12. The non-transitory computer readable storage medium of claim 11, wherein said program code further comprises correlating said at least one label name with said at least one zone for said image source comprising translating said at least one labeled zone into percentage offsets from the edges of said source image.

13. The non-transitory computer readable storage medium of claim 11, wherein said program code further comprises performing further granular analyses by performing another iteration by returning to said step of comparing objects wherein said comparing uses any of: pixel resolution in analysis of specific bounding boxes, image filtering parameters, and degree of computational effort in searching for contiguous zones.

14. The non-transitory computer readable storage medium of claim 11, wherein a task of said generated tasks is sending a notification to the end user entity.

15. The non-transitory computer readable storage medium of claim 11, wherein label hits are correlated each with any one of source images sourced from a particular camera of a particular user and wherein the user is able to perform any of: view, review, and rate the accuracy of said label hit.

* * * * *